(12) United States Patent
Zhou

(10) Patent No.: US 8,780,546 B2
(45) Date of Patent: Jul. 15, 2014

(54) DOCKING STATION FOR ELECTRONIC DEVICE

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 153 days.

(21) Appl. No.: 13/279,593

(22) Filed: Oct. 24, 2011

(65) Prior Publication Data

US 2012/0293949 A1 Nov. 22, 2012

(30) Foreign Application Priority Data

May 20, 2011 (CN) .......................... 2011 1 0130916

(51) Int. Cl.
- *G06F 1/16* (2006.01)
- *H05K 5/00* (2006.01)
- *H05K 7/00* (2006.01)
- *G06F 13/00* (2006.01)

(52) U.S. Cl.
USPC ..................... 361/679.41; 710/303

(58) Field of Classification Search
USPC .................................. 710/303, 304
See application file for complete search history.

(56) References Cited

U.S. PATENT DOCUMENTS

| | | | | |
|---|---|---|---|---|
| 4,468,836 A * | 9/1984 | Omata | ............................... | 16/82 |
| 5,144,290 A * | 9/1992 | Honda et al. | ................... | 345/156 |
| 5,239,444 A * | 8/1993 | Sasaki | ...................... | 361/679.12 |
| 6,898,080 B2 * | 5/2005 | Yin et al. | ................. | 361/679.41 |
| 7,201,407 B2 * | 4/2007 | Schlack | ........................ | 292/139 |
| 7,469,951 B2 * | 12/2008 | Welschholz et al. | .......... | 296/37.8 |
| 7,643,283 B2 * | 1/2010 | Jubelirer et al. | ......... | 361/679.41 |
| 7,689,197 B2 * | 3/2010 | Laude et al. | ..................... | 455/344 |
| 7,817,414 B2 * | 10/2010 | Chou et al. | .............. | 361/679.41 |
| 8,159,818 B2 * | 4/2012 | Riddiford | ................ | 361/679.41 |
| 2003/0128505 A1 * | 7/2003 | Yin et al. | ....................... | 361/686 |
| 2004/0109722 A1 * | 6/2004 | Huang | ............................ | 403/57 |
| 2005/0071290 A1 * | 3/2005 | Brooks et al. | .................. | 705/401 |
| 2005/0265569 A1 * | 12/2005 | Langberg et al. | ............. | 381/334 |
| 2006/0044752 A1 * | 3/2006 | Lin et al. | ....................... | 361/686 |
| 2006/0104018 A1 * | 5/2006 | Tracy et al. | ..................... | 361/683 |
| 2006/0187629 A1 * | 8/2006 | Emery et al. | .................. | 361/684 |
| 2006/0250764 A1 * | 11/2006 | Howarth et al. | .............. | 361/683 |
| 2006/0274910 A1 * | 12/2006 | Schul et al. | .................... | 381/334 |
| 2007/0073952 A1 * | 3/2007 | Tsai et al. | ..................... | 710/303 |
| 2008/0089547 A1 * | 4/2008 | Young et al. | .................. | 381/386 |
| 2008/0137285 A1 * | 6/2008 | Chuang | .......................... | 361/686 |
| 2008/0166896 A1 * | 7/2008 | Choi et al. | ...................... | 439/43 |
| 2008/0239658 A1 * | 10/2008 | Chou et al. | .................... | 361/686 |
| 2009/0009957 A1 * | 1/2009 | Crooijmans et al. | .......... | 361/686 |
| 2010/0062615 A1 * | 3/2010 | Prest | .............................. | 439/38 |
| 2010/0073862 A1 * | 3/2010 | Carnevali | ................ | 361/679.43 |
| 2010/0158297 A1 * | 6/2010 | Stuczynski | ................... | 381/332 |
| 2010/0188808 A1 * | 7/2010 | Howarth et al. | ......... | 361/679.41 |
| 2010/0195279 A1 * | 8/2010 | Michael | ................... | 361/679.41 |
| 2010/0271761 A1 * | 10/2010 | Lev | ........................... | 361/679.01 |

* cited by examiner

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A docking station used for receiving an electronic device. The docking station includes a housing, a retractable docking port, and a rotating shaft. The housing defines a receiving groove. The docking port can be positioned by manipulation of the rotating shaft to be exposed in the receiving groove or retracted and hidden inside the housing.

17 Claims, 5 Drawing Sheets

DOCKING STATION FOR ELECTRONIC DEVICE

BACKGROUND

1. Technical Field

The present disclosure relates to docking stations, and in particular, to a docking station for an electronic device.

2. Description of Related Art

Many hand held electronic devices, such as mobile phones and music players, can be received in docking stations. A docking station will include a port that can allow the electronic device to communicate with other devices through the docking station. Generally, the docking station defines a slot for supporting the electronic device. However, the port is typically arranged in a fixed configuration, which is inconvenient should users only want to use the docking station as just a stand without engaging the port. Furthermore, when not in use the port is exposed and may be infiltrated by dust and other contaminants, which can degrade or shorten the life of the port and hence the docking station.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
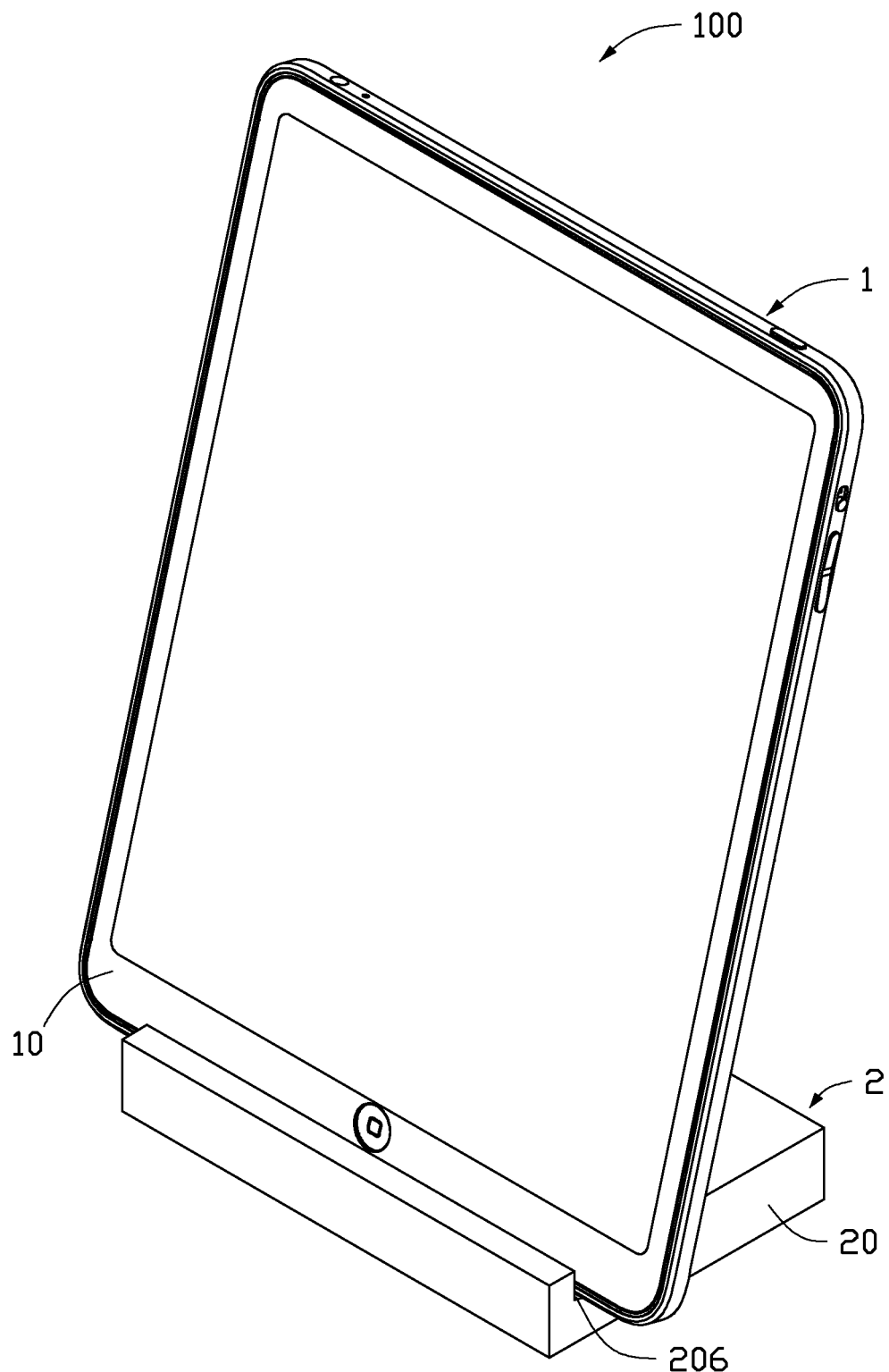
FIG. 1 is a schematic view of a docking station with an electronic device engaged therein according to an embodiment of the present disclosure.

Referring to FIG. 1, an electronic apparatus 100 including an electronic device 1 and a docking station 2 for docking and/or supporting the electronic device 1 is shown. The electronic device 1 may be any hand-held electronic device such as a mobile phone, a tablet computer, etc. The electronic device 1 has an end portion 10 defining a port (not shown) for engaging a docking port 30. The docking station 2 can be used as a stand for supporting the electronic device 1 in a convenient position and can also act as a docking station providing convenient interface between the electronic device 1 and peripheral devices, or a power supply such as a computer or a charger.

Figure 2:
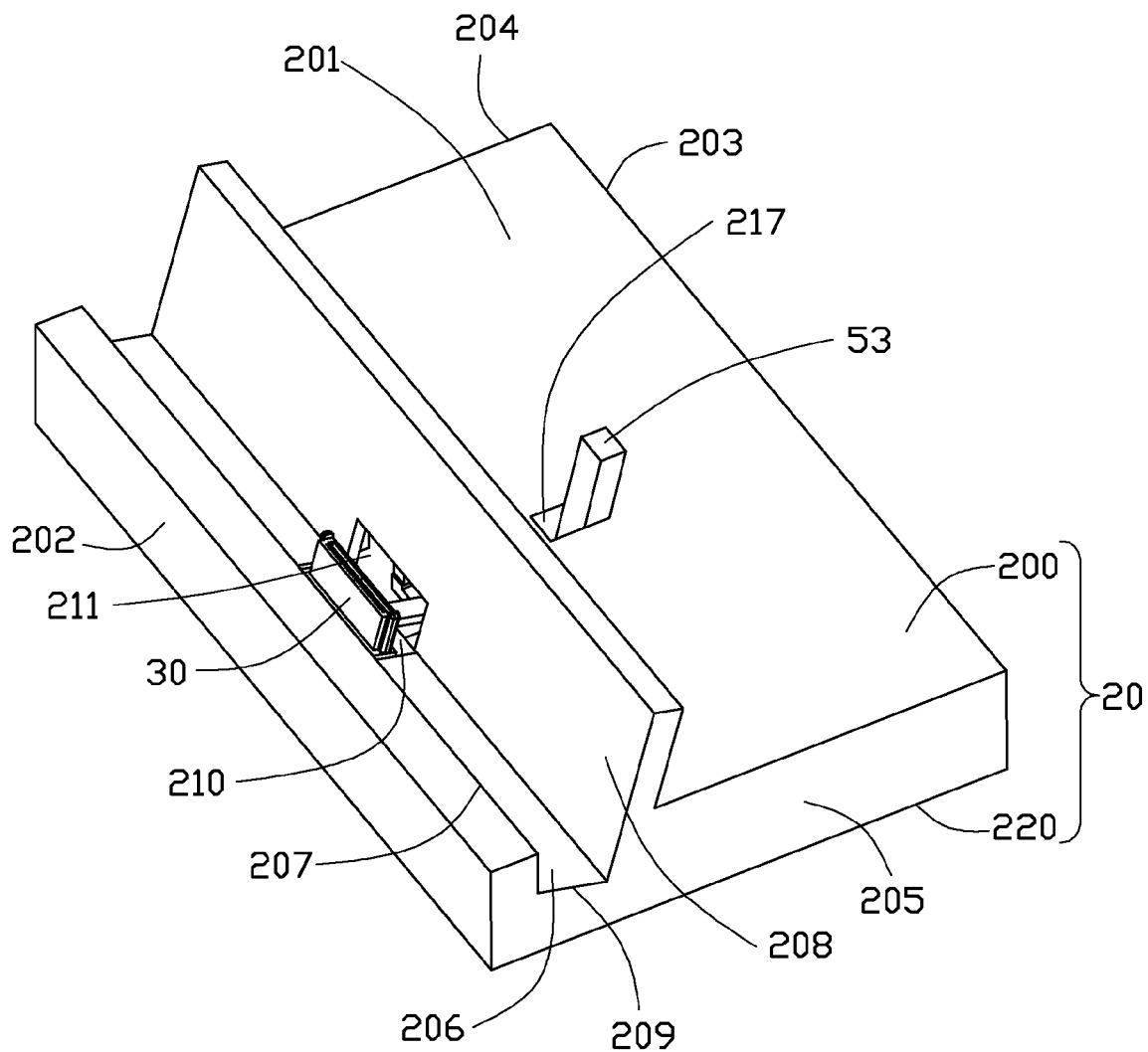
FIG. 2 is a schematic view of the docking station of FIG. 1 in a first state.

Referring to FIG. 2, the docking station 2 includes a housing 20 and a retractable docking port 30 mounted to the housing 20. The housing 20 includes an upper housing 200 and a lower housing 220 attached to the upper housing 200. The upper housing 200 cooperates with the lower housing 220 to receive components of the docking station 2. The docking port 30 can engage in the port of the electronic device 1 for electrically connecting with the electronic device 1.

The upper housing 200 includes a top wall 201 and four sidewalls 202, 203, 204, 205 respectively protruding downwards from four rims of the top wall 201. The top wall 201 defines a receiving groove 206 partially surrounded by a front wall 207, a rear wall 208, and a bottom wall 209. The front wall 207 is substantially perpendicular to the lower housing 220. The rear wall 208 slants upward from the top wall 201 and forms an acute angle with the top wall 201. The bottom wall 209 is substantially perpendicular to the rear wall 208 and cooperates with the rear wall 208 to support the electronic device 1 in a desired orientation such as an inclined position in this embodiment when the electronic device 1 is received in the receiving groove 206. A first through hole 210 is defined in the bottom wall 209 and a second through hole 211 is defined in the rear wall 208. The first and second through holes 210, 211 meet at right angles to form a slot through which the docking port 30 can pass. The top wall 201 further defines a third through hole 217 adjacent to the rear wall 208.

Figure 3:
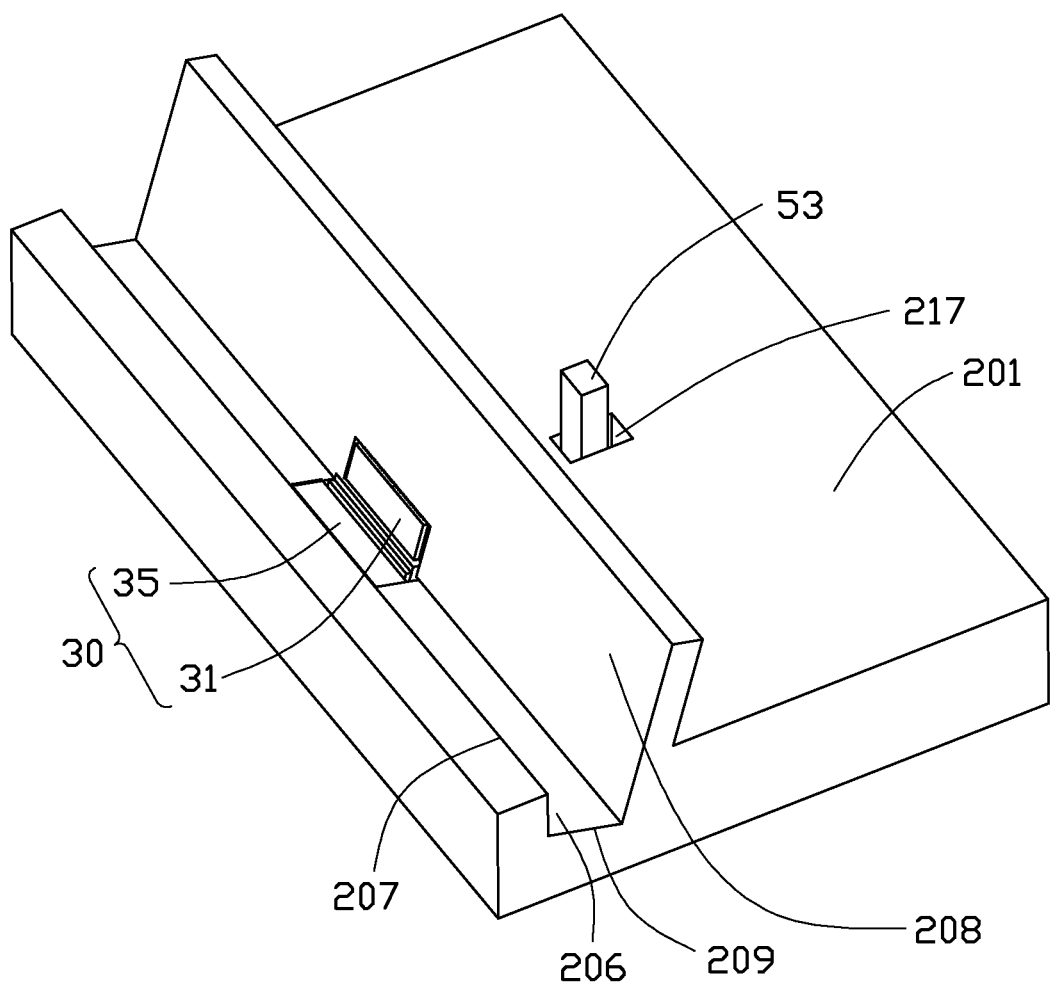
FIG. 3 is similar to FIG. 2 but with the docking station in a second state.
Figure 5:
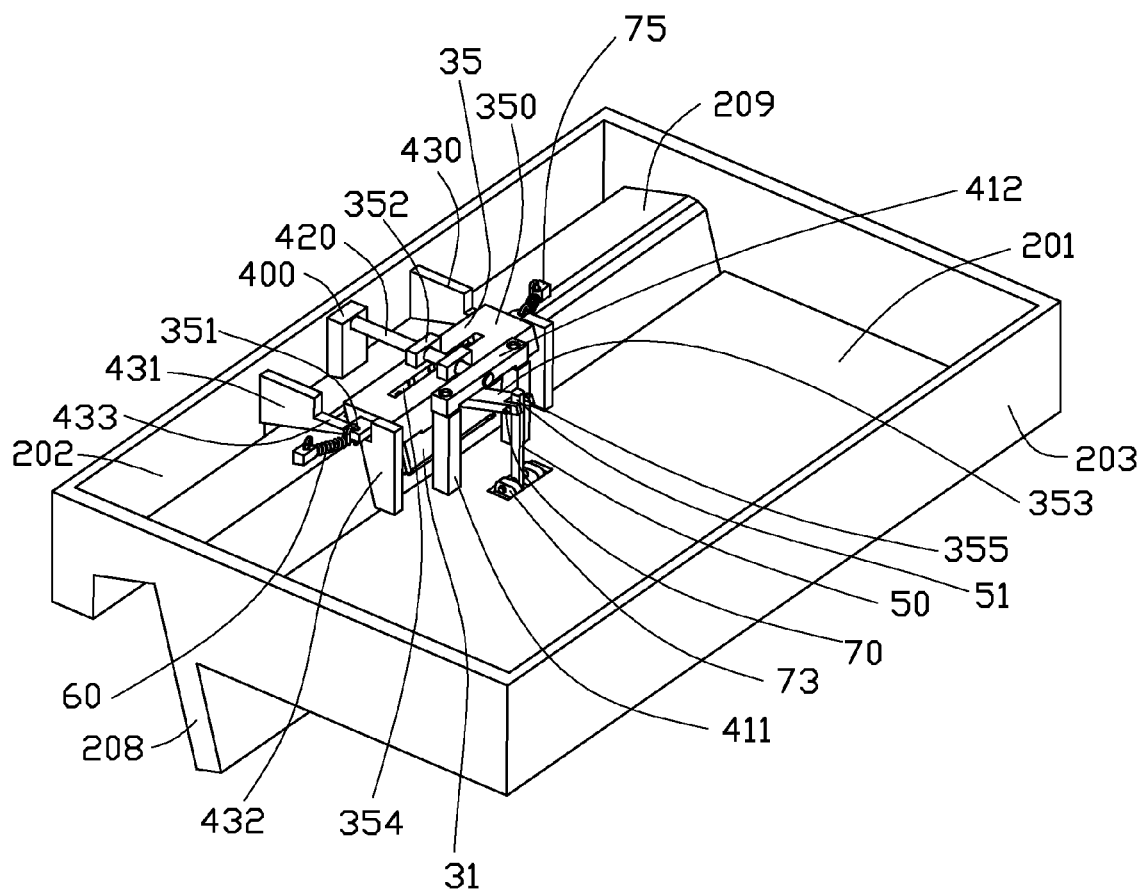
FIG. 5 is a partly schematic view of FIG. 3.

The docking port 30 is arranged in the receiving groove 206 and is operatively engaged with the socket of the electronic device 1. The docking port 30 is interchangeable between a first position in which a connector 31 (see FIG. 3) of the docking port 30 is exposed in the receiving groove 206 and a second position in which the connector 31 is retracted from the receiving groove 206 into the housing 20. As shown in FIGS. 3 and 5, the docking port 30 further includes a sliding assembly 35 for holding the connector 31.

Figure 4:
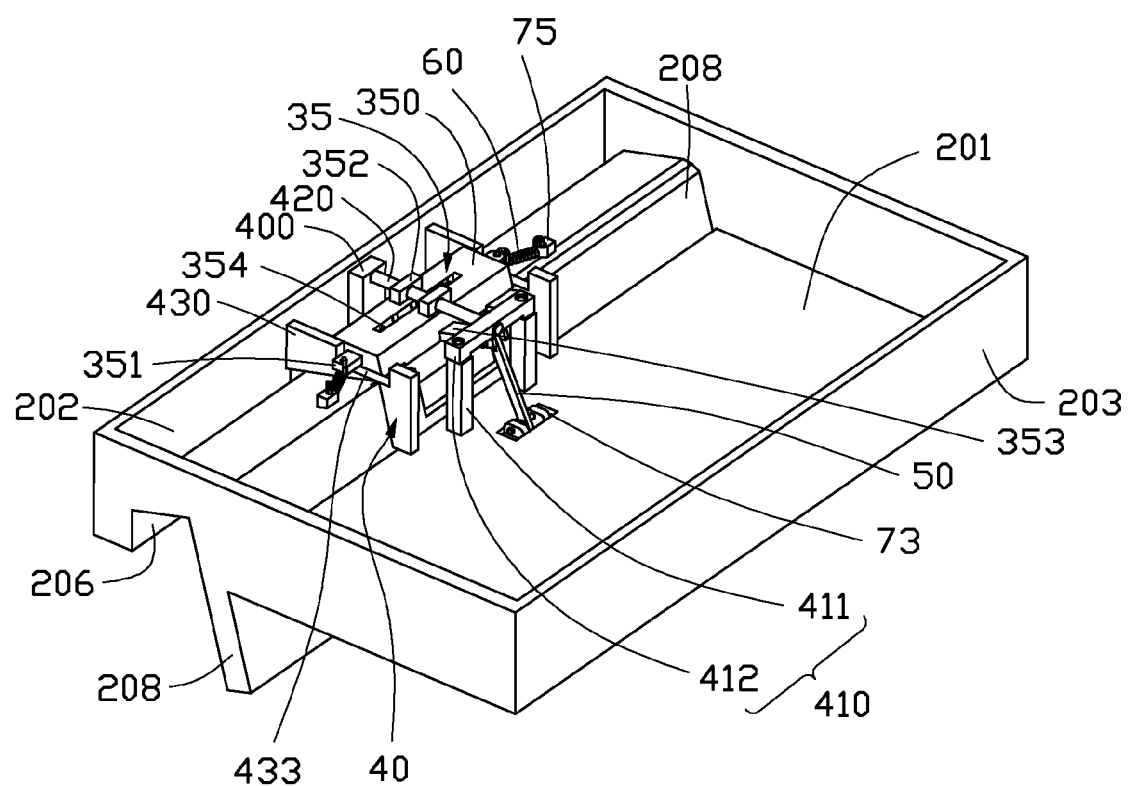
FIG. 4 is a partly schematic view of the docking station of FIG. 2.

Referring also to FIG. 4, the sliding assembly 35 includes a main part 350, two clasping portions 351, two protrusions 352, and a cantilever 353. The main part 350 is slidably disposed between the internal surface of the side wall 202 and the internal surface of the rear wall 208. The main part 350 is substantially paralleled to the bottom wall 209 and defines a receiving portion 354 for receiving the connector 31. One end of the connector 31 extends through the first through hole 210 when the docking port 30 is located in the first position. The clasping portions 351 respectively protrude from opposite sides of the main part 350 and face away from each other. The two protrusions 352 protrude from a bottom side of the main part 350 which faces the lower housing 220. The cantilever 353 protrudes from one side of the main part 350 facing the side wall 203 and is extendable through the second through hole 211. Free end of the cantilever 353 defines a first opening 355 (see FIG. 5).

The docking station 2 further includes a guiding assembly 40, a rotating shaft 50, and two elastic members 60. The guiding assembly 40 is secured to the upper housing 200 for guiding the moving direction and limiting the moving distance of the docking port 30. The rotating shaft 50 is connected to the sliding assembly 35 for driving the docking port 30 to slide between the first and second position when being pushed or pulled. The elastic members 60 are connected to the docking port 30 for driving the docking port 30 back to the first position.

The guiding assembly 40 includes a first connection member 400, a second connection member 410, a guiding rod 420, and two restricting members 430. The first connection member 400 is mounted to the internal surface of the side wall 202. The second connection member 410 protrudes from the internal surface of the top wall 201 and is adjacent to the second through hole 211. The second connection member 410 in the illustrated embodiment is a substantially inverted U shaped piece, and includes two holding posts 411 protruding from the internal surface of the top wall 201 and a connection post 412 connecting the two holding posts 411. Opposite ends of the guiding rod 420 are respectively connected to the first connection member 400 and the middle of the connection post 412. The guiding rod 420 is rotatably connected to the protrusions 352 to guide the moving direction of the docking port 30.

The two restricting members 430 are respectively located at two sides of the first through hole 210 to define a channel for receiving the main part 350. As shown in FIG. 5, each restricting member 430 includes a first end portion 431 and a second end portion 432 opposite to the first end portion 431. The first end portion 431 is mounted to the internal surface of the side wall 202. The second end portion 432 protrudes upwards from the internal surface of the top wall 201 and is connected to the internal surface of rear wall 208. The two second end portions 432 are respectively located at opposite sides of the second through hole 211. The restricting member 430 further defines a second opening 433 between the first and second end portions 431, 432 for limiting the moving distance of the clasping portions 351.

The rotating shaft 50 includes a connection end 51 and an operating end 53 opposite to the connection end 51. The connection end 51 is rotatably connected to the clasping portion 351 by a first connection rod 70 such that the rotating shaft 50 can drive the docking port 30 to slide between the first position and the second position. The operating end 53 is extendable out of the housing 20 through the third through hole 217. The rotating shaft 50 is rotatably connected to a second connection rod 73 arranged in the third through hole 217 to allow the rotating shaft 50 to be rotatably engageable with the upper housing 200 when the operating end 53 is pulled or pushed.

One end of each elastic member 60 is connected to the corresponding clasping portion 351, and the other end of each elastic member 60 is secured to a fixing member 75 protruding from the internal surface of the top wall 201. Each fixing member 75 is substantially aligned with the clasping portion 351 when the docking port 30 is located in the first position.

In assembly, the connector 31 is secured to the sliding assembly 35 with an end thereof opposite to the sliding assembly 35 being extendable out of the top wall 201 through the first through hole 210. The guiding rod 420 is inserted into the protrusions 352. Opposite ends of the guiding rod 420 then are respectively connected to the first and second connection members 400, 410. At this time, the sliding assembly 35 is slideably received in the channel defined by the two restricting members 430, and the clasping portions 351 are respectively received in the second openings 433. The rotating shaft 50 is rotatably connected to the upper housing 220 by the second connection rod 73. The connection end 51 of the rotating shaft 50 is rotatably connected to the free end of the cantilever 353 via the first connection rod 70, and the operating end 53 extends out of the upper housing 220 through the third through hole 217. Opposite ends of each elastic member 60 are respectively secured to the clasping portion 351 and the fixing member 75.

When the docking port 30 is located in the first position, the clasping portions 351 abuts the corresponding first end portions 431, and the receiving portion 354 of the main part 350 is aligned with the first through hole 210. Thus, the connector 31 is allowed to extend out of the housing 20 through the first through hole 210 and be exposed in the receiving groove 206. In this state, the end portion 10 of the electronic device 1 may be accommodated in the receiving groove 206 with the connector 31 engaging with the port of the electronic device 1.

When the operating end 53 of the rotating shaft 50 is pushed or pulled, the sliding assembly 35 is driven to move away from the side wall 202 along a direction substantially perpendicular to the side wall 202, and the elastic members 60 are elongated to deformed. With the guidance of the guiding rod 420 and the restricting members 430, the sliding assembly 35 is capable of sliding from the first position to the second position, and the connector 31 is driven to slide to pass through the slot defined by the first and second through holes 210, 211. Thus, the docking port 30 moves to the second position and is hidden inside the housing 20, and the electronic device 1 is allowed to be placed in the receiving groove 206 without engaging with the connector 31.

When the rotating shaft 50 is released, the elastic member 60 rebounds, and the docking port 30 is driven to return to its first position to allow the connector 31 to be exposed in the receiving groove 206 again.

Even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A docking station for receiving an electronic device, comprising:
   a housing defining a receiving groove, wherein the receiving groove is partially surrounded by a bottom wall and a rear wall connected to the bottom wall, the bottom wall defines a first through hole and the rear wall defines a second through hole, the first through hole and the second through hole meet to define a slot;
   a retractable docking port received in the housing, the docking port comprising a connector engageable with the electronic device when the electronic device is inserted in the docking station and a sliding assembly connected to the connector for holding the connector, the connector being capable of interchanging between a first position exposed in the receiving groove and a second position passing through the slot into the housing and being hidden inside the housing, the sliding assembly being slidable relative to the housing to allow the docking port to be hidden inside the housing; and
   a rotating shaft connected to the docking port, the rotating shaft driving the docking port to slide towards the second position from the first position when being operated.

2. The docking station as claimed in claim 1, wherein the rotating shaft comprises a connection end rotatably connected to the docking port and an operating end opposite to the connection end, the operating end is extendable out of the housing to be pulled or pushed to drive the docking port to move to the second position from the first position.

3. The docking station as claimed in claim 2, wherein the housing defines a third through hole to allow the rotating shaft to extend therethrough, the docking station further comprises a connection rod fixed in the third through hole, and the rotating shaft is further rotatably connected to the connection rod.

4. The docking station as claimed in claim 2, wherein the docking station further comprises at least one elastic member disposed between the docking port and the housing for driving the docking port to be exposed in the receiving groove.

5. The docking station as claimed in claim 1, wherein the docking station further comprises a guiding assembly connected to the docking port and the housing for guiding the moving of the docking port.

6. The docking station as claimed in claim 5, wherein the guiding assembly comprises a guiding rod passing through the docking port for guiding the moving direction of the docking port.

7. The docking station as claimed in claim 6, wherein the guiding assembly further comprises two restricting members located at two opposite sides of the docking port and defining a channel for receiving the docking port.

8. The docking station as claimed in claim 7, wherein each restricting member defines an opening for partly receiving the docking port and limiting the moving distance of the docking port.

9. The docking station as claimed in claim 1, wherein the housing comprises a top wall and four sidewalls respectively protruding downwards from four rims of the top wall, the receiving groove is defined in the top wall, the rear wall slants upward from the top wall and forms an angle with the top wall; the bottom wall is perpendicular to the rear wall and cooperates with the rear wall to support the electronic device in an inclined position when the electronic device is received in the receiving groove.

10. A docking station, comprising:
   a housing defining a receiving groove, a slot defined in the receiving groove; and
   a retractable docking port comprising:
      a connector engageable with a socket of an electronic device when the electronic device is inserted in the receiving groove; and
      a sliding assembly disposed inside the housing and connected to the connector for holding the connector, the sliding assembly being slidable relative to the housing to interchangeably arrange the connector in the receiving groove and retract the connector to pass through the slot into the housing to hide the connector inside the housing;
   wherein the receiving groove is partially surrounded by a bottom wall and a rear wall substantially perpendicular to the bottom wall, the bottom wall and the rear wall are capable of corresponding to sides of the electronic device, and the connector is extendable out of the housing through the bottom wall and passable through the rear wall to hide inside the housing.

11. The docking station as claimed in claim 10, wherein a first through hole is defined in the bottom wall and a second through hole is defined in the rear wall, the first through hole and the second through hole meet to define the slot through which the connector can pass.

12. The docking station as claimed in claim 10, wherein the docking station further comprises a rotating shaft connected to the sliding assembly, the rotating shaft drives the sliding assembly to slide relative to the housing to a second position from a first position when being operated.

13. The docking station as claimed in claim 12, wherein one end of the rotating shaft is rotatably connected to the sliding assembly and the other end thereof is extendable out of the housing through a third through hole defined in the housing.

14. The docking station as claimed in claim 12, wherein the docking station further comprises at least one elastic member connected to the housing and the sliding assembly for driving the docking port back to the first position.

15. The docking station as claimed in claim 10, wherein the docking station further comprises a guiding rod connected to the sliding assembly for guiding the moving direction of the sliding assembly.

16. The docking station as claimed in claim 10, wherein the docking station further comprises two restricting members located at two opposite sides of the sliding assembly for limiting the moving distance of the sliding assembly.

17. The docking station as claimed in claim 16, wherein each restricting member defines an opening partially receiving the sliding assembly for limiting the moving distance of the sliding assembly.

* * * * *